United States Patent [19]

McNally

[11] Patent Number: 4,820,477

[45] Date of Patent: Apr. 11, 1989

[54] METHOD AND APPARATUS FOR PROVIDING A NON-RADIOACTIVE COOLANT FOR A NUCLEAR REACTOR

[76] Inventor: Lillian McNally, 1444 Rhode Island Ave., NW., Washington, D.C. 20036

[21] Appl. No.: 946,156

[22] Filed: Dec. 23, 1986

Related U.S. Application Data

[63] Continuation of Ser. No. 509,027, Jun. 29, 1983, abandoned.

[51] Int. Cl.$^4$ .......................... G21C 19/30; G21F 9/00
[52] U.S. Cl. .................................... 376/310; 252/626; 252/632
[58] Field of Search ............... 376/310, 313, 256, 209; 423/648 A; 252/632, 626

[56] References Cited

U.S. PATENT DOCUMENTS

| 3,505,017 | 4/1970 | Roth | 376/313 X |
| 3,937,649 | 2/1976 | Ridgely | 376/310 |
| 4,123,324 | 10/1978 | Sanada et al. | 376/313 |

FOREIGN PATENT DOCUMENTS

| 575762 | 5/1959 | Canada | 423/648 A |
| 1185770 | 4/1985 | Canada . | |
| 69222 | 1/1983 | European Pat. Off. | 423/648 A |
| 130881 | 1/1985 | European Pat. Off. | 376/310 |
| 1526867 | 5/1968 | France . | |
| 106791 | 8/1979 | Japan | 376/310 |
| 1247590 | 9/1971 | United Kingdom . | |

Primary Examiner—John S. Maples
Attorney, Agent, or Firm—Berman, Aisenberg & Platt

[57] ABSTRACT

A method of decreasing the danger associated with nuclear reactors is disclosed. According to the method, the coolant is treated to remove deuterium to prevent formation of dangerous tritium. The preferred process uses a distillation columnm to continuously remove heavy and intermediate-weight water from a bleed stream. Light water is returned to the coolant circuit.

10 Claims, 1 Drawing Sheet

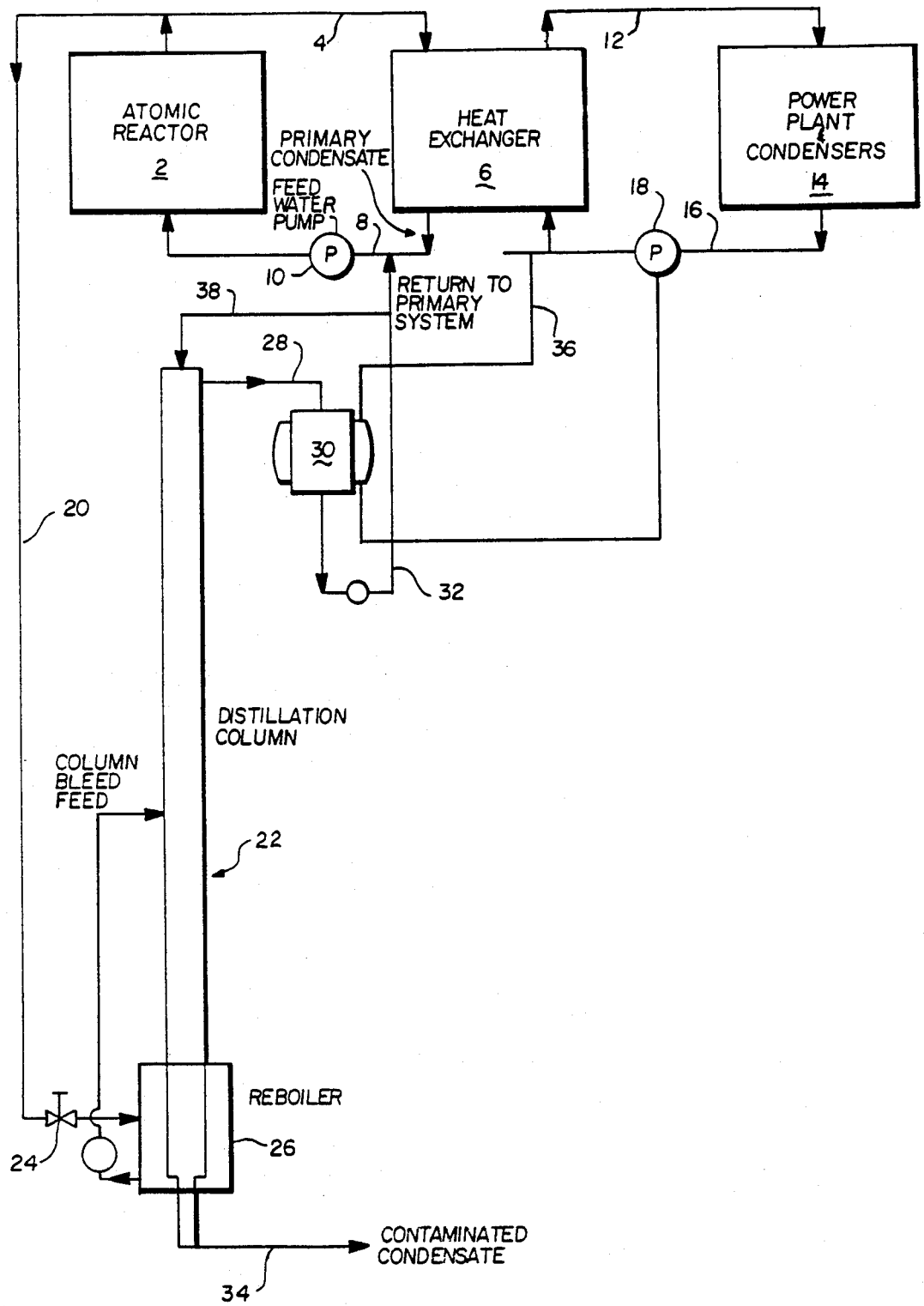

METHOD AND APPARATUS FOR PROVIDING A NON-RADIOACTIVE COOLANT FOR A NUCLEAR REACTOR

This application is a continuation of Ser. No. 509,027, filed June 29, 1983, now abandoned.

TECHNICAL FIELD

This invention relates to the art of nuclear reactors, particularly the art of light-water cooled nuclear power plants.

BACKGROUND ART

The known fission nuclear reactor employs a fuel, such as uranium, to produce heat which is transferred to a generating apparatus, typically a turbine driven generator. A known uranium fuel is enriched uranium-235. A coolant medium is circulated through the reactor to absorb heat produced by the nuclear reaction to create steam much as in oil or gas steam-generating processes. The steam is directed to a turbine to drive a generator, and the steam is then condensed and reintroduced to the coolant stream as a liquid.

U.S. Pat. No. 3,222,255 (Maldague) teaches a circuit for a nuclear reactor wherein a distillation column is used for removing substances which are suspended or in solution in the coolant circuit. The coolant intentionally contains a substantial amount of heavy water.

It is known to use either light water ($H_2O$) or heavy water ($D_2O$) as the coolant medium. Light water is used because of its good heat transfer and abundance. A reactor using light water as a coolant is commonly known as a light-water reactor.

A significant problem with the known nuclear reactor is that the coolant medium becomes radioactive because of bombardment of the medium with neutrons produced by the nuclear reaction. When water is used as the coolant medium, the bombardment with neutrons produces tritium which is highly radioactive and dangerous. The production of tritium is a two-step process. First, light hydrogen accepts one neutron to produce deuterium (heavy hydrogen). Second, the heavy hydrogen accepts another neutron to become the heaviest known hydrogen, which is called tritium. The second reaction is much slower than the first.

The major technique of preventing escape of tritium is to seal the coolant medium so as to prevent its escape. It is impossible, however, to fully prevent escape of the coolant medium since there must be a pressure relief valve for those instances when the coolant medium becomes overheated. It is a major safety hazard for the reactor to overheat thus causing the pressure relief valve of the coolant circuit to open and release tritium into the atmosphere.

SUMMARY OF THE INVENTION

The invention prevents a safety hazard caused by the presence of tritium in a coolant medium of a light-water reactor by removing deuterium from the coolant.

According to the invention, deuterium is continuously removed from the coolant medium, and formation of tritium is accordingly reduced or prevented. Thus, when a reactor overheats and the pressure relief valve is opened, exiting steam will not present a safety hazard because it will contain an extremely small amount of tritium.

Deuterium formed in the coolant medium combines with oxygen and either hydrogen or deuterium to form intermediate weight water or heavy water. Intermediate weight water and heavy water may be separated from light water by known apparatus. Since the difference in boiling points of the intermediate weight and light weight water is about one-half degree Celsius while that of the heavy water and the light water is about one degree Celsius, a preferred apparatus for separating these materials is a distillation column having about one hundred plates. The distillation column has one advantage that heat from the circulating coolant may be used to boil the material in the distillation column, and a second advantage that heat removed by the column's condenser can be used to preheat a coolant used in a secondary circuit.

In accordance with the invention, only a portion of the circulating coolant stream is subjected to removal of deuterium or heavy water. It has been determined that if approximately a one-percent bleed sample is taken continuously from the coolant medium, enough deuterium, or heavy and intermediate water, will be removed to diminish the level of deuterium progressively from 1 part per 6,400 parts to 1 part per 10,000 parts or as far as it is determined practical to go. This will prevent formation of an unsafe level of tritium.

It is an object of this invention to provide increased safety in a nuclear reactor.

It is a further object of this invention to prevent the formation of an unsafe level of tritium in a coolant medium for a nuclear reactor.

It is a still further object of this invention to continuously remove deuterium from the coolant medium of a nuclear reactor.

BRIEF DESCRIPTION OF THE DRAWINGS

The FIGURE shows a schematic view of a nuclear reactor system.

DETAILED DESCRIPTION OF THE INVENTION

The FIGURE shows a schematic view of a typical power plant using an atomic reactor as the heat source. The atomic reactor 2 uses enriched uranium as a fuel to heat a coolant medium to produce a high temperature stream 4 which is directed to a heat exchanger 6. After passing through the heat exchanger 6, a lower temperature stream 8 is directed back to the reactor 2 to complete a circuit. A pump 10 serves to drive the coolant medium in the circuit.

The heat exchanger 6 transfers heat from a primary cooling medium to a secondary stream which is used to drive electric generators. A high temperature secondary stream 12 exits the heat exchanger 6 and is directed to a power plant 14. This power plant typically contains a plurality of turbines which are driven by a high temperature steam and which are in turn connected to generators for generating electricity. A low temperature secondary stream 16 is directed from the power plant back to the heat exchanger 6. A second pump 18 is used to drive the fluid in the secondary stream.

The primary and secondary streams are used to prevent radioactive medium from being introduced into the power plant. When the primary stream is made safe in accordance with the invention, the plant may be designed so that the primary stream drives the turbines.

In accordance with the invention, a bleed stream 20 is taken from the primary coolant stream and is fed into a distillation column 22. This bleed stream is preferably one percent of the primary stream, but need not be so limited, depending upon the particular circumstances. The size of the bleed stream should be adequate to reduce the amount of deuterium in the primary stream to below the concentration of deuterium found in nature. The normal concentration of deuterium is 1/6,400, and it is preferred to reduce the concentration of deuterium in the primary stream to at least between 1/6400–1/10,000. It may be practical in some instances to reduce the deuterium concentration even further.

The bleed stream 20 is directed through a pressure relief valve 24 and into the reboiler 26 of the distillation column. Since the heavy water in the bleed stream has a higher boiling point than that of the light water in the bleed stream, the distillation column will separate the deuterium-containing water from the light water. Vaporized light water is taken out of the top of the distillation column at 28, and the light-water vapor is then directed to a condenser 30. Part of the condensed light water 32 is directed back into the low-temperature primary stream 8, and part becomes reflux water for the distillation column and is carried through line 38.

Heavy water and intermediate weight water, containing deuterium, are taken from the distillation column at 34 and disposed of or sold for known uses.

The condenser is a heat exchanger with cooling supplied by cool water 36 from the lower-temperature secondary stream 16. The cooling water 36 is returned to the stream 16 after passing through the condenser 30. This arrangement provides for a very efficient use of energy in the plant since the heat removed from the light-water steam 38 is added back to the circulating stream 16.

It will be appreciated by those of skill in the art that a very safe nuclear reactor has been provided wherein the formation of dangerous tritium will be prevented.

While a preferred embodiment has been described, variations within the scope of the invention will be apparent to those of skill in the art.

What is claimed is:

1. In a light-water cooled nuclear reactor, a method for preventing formation of tritium in a circulating light-water coolant medium for said nuclear reactor comprising diverting only a portion of said circulating light water coolant medium to means for removing deuterium to continuously remove deuterium from said portion of said circulating medium during normal operation of said reactor.

2. The method of claim 1 wherein said portion is substantially one percent of said circulating medium.

3. The method of claim 1 wherein said step of continuously removing deuterium comprises returning a remainder of said portion having a reduced deuterium content to said circulating medium.

4. The method of claim 3 wherein said step of removing comprises physically separating said portion from said circulating medium and directing said portion to a means for removing deuterium from said portion.

5. The method of claim 4 wherein said means for removing deuterium is a distillation column.

6. The method of claim 5 wherein the deuterium concentration of said remainder is less than about one part in 6,400.

7. The method of claim 5 wherein said step of separating comprises vaporizing light water from said portion and condensing said vaporized light water to produce said remainder.

8. In a light-water nuclear reactor, wherein predominantly light water is a circulating coolant medium in a coolant circuit, the improvement comprising means for directing only a portion of said circulating coolant from said coolant circuit to means for removing deuterium from said circulating coolant during normal operation of said reactor, and means for returning said portion to said circuit, whereby the formation of tritium is substantially prevented.

9. The reactor of claim 8 wherein said means for removing deuterium is a distillation column which separates heavy water in said portion from light water in said portion, and means for returing said separated light water to said circulating coolant.

10. The reactor of claim 9 wherein said portion is substantially one percent of said circulating coolant.

* * * * *